United States Patent [19]
Nakamura et al.

[11] Patent Number: 5,106,539
[45] Date of Patent: Apr. 21, 1992

[54] NON-ELECTRIFICATION POLYMERIC COMPOSITE MATERIAL

[75] Inventors: Kiyofumi Nakamura, Settsu; Yasuyuki Yamaguchi, Toyonaka; Mitsugu Omori, Suita, all of Japan

[73] Assignee: Daikin Industries, Ltd., Osaka, Japan

[21] Appl. No.: 394,417

[22] Filed: Aug. 16, 1989

[30] Foreign Application Priority Data

Aug. 29, 1988 [JP] Japan .................. 63-214502

[51] Int. Cl.$^5$ .................. H01B 1/06; B32B 5/16
[52] U.S. Cl. .................. 252/511; 252/512; 252/514; 252/518; 252/520; 428/327
[58] Field of Search .............. 252/511, 520, 512, 518, 252/514; 524/495, 496, 439, 461; 525/330.7; 428/327

[56] References Cited

U.S. PATENT DOCUMENTS 4,664,846 5/1987 Enjo et al. .................. 252/511

FOREIGN PATENT DOCUMENTS 085413 8/1983 European Pat. Off. .
197781 10/1986 European Pat. Off. .
312077 4/1989 European Pat. Off. .
58-207651 12/1983 Japan .
88/07063 9/1988 World Int. Prop. O. .

Primary Examiner—Josephine Barr
Attorney, Agent, or Firm—Wenderoth, Lind & Ponack

[57] ABSTRACT

A non-electrification polymeric composite material composed of a tetrafluoroethylene/fluoro(alkyl vinyl ether) copolymer containing 4% by weight or more fluoro(alkyl vinyl ether) and an electrically conductive material.

This non-electrification polymeric composite material is suitably used in a holder for holding a semiconductor substrate, or the like.

8 Claims, 4 Drawing Sheets

NON-ELECTRIFICATION POLYMERIC COMPOSITE MATERIAL

BACKGROUND OF THE INVENTION

1. Field of the Invention

This invention relates to a non-electrification polymeric composite material capable of being suitably used, for example, to hold a semiconductor substrate.

2. Description of the Prior Art

In producing a semiconductor device, there are performed a series of steps, such as etching a semiconductor wafer, washing the wafer, and the like, with the semiconductor wafer being held by, for example, an etching holder and carrier holder. Heretofore, as the material comprising such a holder for holding the semiconductor wafer, there has been used a chemically resistant and heat-resistant fluoro resin such as polytetrafluoroethylene (referred to as PTFE) and a copolymer of perfluoro(alkyl vinly ether) and tetrafluoroethylene (PFA), or the like. Each of such polytetrafluoroethylene (PTFE) and copolymer of perfluoro(alkyl vinyl ether) and tetrafluoroethylene (PFA) is excellent in electric insulation and has an electric resistivity as high as $10^{18} \sim 10^{19}$ Ω.cm at room temperature, and hence is readily electrified due to friction.

Accordingly, for example, in the case where a carrier holder comprising such a fluoro resin material is dried by utilization of centrifugal force and rotated at a high speed, the carrier holder is charged with static electricity due to friction with air molecules. Consequently, the adjacent dust, dirt, or the like is attracted to the thus electrified holder and sticks to the surface of the semiconductor wafer leading to a decreased yield of semiconductor chips.

A technique to overcome such a problem is described in Japanese Laid-Open Patent Application No. 58-207651. This prior art discloses that mixing an electric conductor such as carbonaceous fiber, carbon black, or the like into the copolymer of perfluoro(alkyl vinyl ether) and tetrafluoroethylene (PFA) produces a composite material which does not lose its chemical and heat resistance in respect to the fluoro resin contained therein and at the same time exhibits a non-electrification characteristic per se.

This prior art, however, has the following problems. A copolymer of perfluoro(alkyl vinyl ether) and tetrafluoroethylene (PFA) generally used currently includes a tetrafluoroethylene copolymer containing 3.0~3.8% by weight perfluoro(alkyl vinyl ether). The melt index of such copolymer of perfluoro(alkyl vinyl ether) and tetrafluoroethylene (PFA) is 1.5-18 g/10 min. When an electric conductor such as carbon black is mixed in the copolymer of perfluoro(alkyl vinyl ether) and tetrafluoroethylene (PFA) to obtain this non-electrification characteristic, the mechanical strength of the copolymer is lowered and the melt viscosity is increased. For example, when 8% by weight acetylene black based on the copolymer of perfluoro(alkyl vinyl ether) and tetrafluoroethylene (PFA), the electrically conductive carbon being excellent in non-staining properties and containing very little impurities, is added to the copolymer of perfluoro(alkyl vinyl ether) and tetrafluoroethylene (PFA), the melt index becomes 40-50% of the melt index of the copolymer of perfluoro(alkyl vinyl ether) and tetrafluoroethylene (PFA) before the addition of the acetylene black. For injection molding, generally, the melt index should be about 10 g/10 min or more.

For injection molding, accordingly, the melt index of the copolymer of perfluoro(alkyl vinyl ether) and tetrafluoroethylene (PFA) before the addition of the acetylene black must be 20 g/10 min or more.

The copolymer of perfluoro(alkyl vinyl ether) and tetrafluoroethylene (PFA) used so far does not satisfy the above melt index with respect to mechanical properties. Therefore, it is inadequate to use the conventional copolymer of perfluoro(alkyl vinyl ether) and tetrafluoroethylene (PFA) and add acetylene black as the material for a holding wafer in the semiconductor device, or the like, since it is poor in molding properties.

There is a corelationship between the similar materials, that is, the smaller the molecular weight, the larger the melt index. For this reason, it is considered to use a copolymer of perfluoro(alkyl vinyl ether) and tetrafluoroethylene (PFA) comprising constituents relatively small in molecular weight and having a melt index of 20 g/10 min or more. In this case, however, though the large melt index may elevate the molding properties, the mechanical properties of the non-electrification polymeric composite material after the addition of the electrically-conductive carbon remarkably deteriorates the mechanical properties of the non-electrification polymeric composite material causing, for example, cracks after molding.

SUMMARY OF THE INVENTION

It is an object of the present invention to provide a non-electrification polymeric material having excellent molding properties and mechanical properties, solving these problems.

To attain the above object, the non-electrification polymeric composite material according to the invention is composed of a tetrafluoroethylene/fluoro(alkyl vinyl ether) copolymer containing 4% by weight or more fluoro(alkyl vinyl ether) and an electrically conductive material.

In a preferred embodiment, the tetrafluoroethylene/fluoro(alkyl vinyl ether) copolymer contains 4-15% by weight fluoro(alkyl vinyl ether).

In another preferred embodiment, the tetrafluoroethylene/fluoro(alkyl vinyl ether) copolymer contains 4-10% by weight fluoro(alkyl vinyl ether).

In the present invention, as described above, the content of the fluoro(alkyl vinyl ether) in the fluoro(alkyl vinyl ether)/tetrafluoroethylene copolymer is 4% by weight or more. When the fluoro(alkyl vinyl ether) content of 4-15% by weight, preferably 4-10% by weight is used, a non-electridication polymeric material having excellent heat resistance and mechanical strength can be manufactured without causing an economical problem or a manufacturing problem such as a drop of polymerization rate.

In the present invention, since the melt index of the fluoro(alkyl vinyl ether)/tetrafluoroethylene copolymer has been improved and the molding properties are good, the electrically conductive material can be mixed in.

As the electrically conductive material, various carbon blacks such as acetylene black, oil black, gas black, furnace black, channel black, and thermal black are used because these electrically conductive carbon materials make the surface of the non-electrification polymeric composite materials smooth. In particular, acetylene black is preferably used because it is excellent in non-staining property and has very little impurities.

Addition of acetylene black largely decreases the fluidity of the non-electrification polymeric composite material, but since in this invention the melt index of the fluoro(alkyl vinyl ether)/tetrafluoroethylene copolymer has been improved and gives good molding properties, acetylene black can be used without any problem.

To attain the above object, the non-electrification polymeric composite material contains acetylene black as the electrically conductive material.

In addition, carbonaceous fiber or graphite can be used as the electrically conductive material. It is also possible to use a metal such as gold, silver, copper, aluminum, and titanium, or metal oxide such as antimony oxide and tin oxide. White electrically conductive material of fibrous potassium titanate or titanium oxide covered with tin oxide and antimony oxide can also be used.

To attain the above object, the non-electrification polymeric composite material according to the invention contains 1-15% by weight of the electrically conductive material.

In a preferred embodiment, the non-electrification polymeric composite material according to the invention contains 5-10% by weight of the electrically conductive material.

In the present invention as described above though the quantity of the electrically conductive material is somewhat different depending upon the type of the electrically conductive material, it is preferably 1-15% by weight, more preferably 5-10% by weight based on the quantity of the non-electrification composite material. A desirable antistatic effect can be obtained in this content range without an increase in melt viscosity, decreased in mechanical strength, or deterioration in surface condition.

To attain the above object, in the non-electrification composite material according to the invention, the melt index of the tetrafluoroethylene/fluoro(alkyl vinyl ether) copolymer is 2 g/10 min to 50 g/10 min.

In a preferred embodiment of the material according to the invention, the melt index of the tetrafluoroethylene/fluoro(alkyl vinyl ether) copolymer is 20 g/10 min to 40 g/10 min.

In the present invention, the melt index of the fluoro(alkyl vinyl ether)/tetrafluoroethylene copolymer is selected from 2 g/10 min to 50 g/10 min as described above. For injection molding the melt index of the fluoro(alkyl vinyl ether)/tetrafluoroethylene copolymer is selected from 20 g/10 min to 40 g/10 min.

To attain the above object in the non-electrification polymeric composite material according to the invention, the fluoro(alkyl vinyl ether) is represented by the general formula:

$$CF_2=CF-(O-CF_2CF)_x-O-(CF_2)_yCF_2Z \quad (1)$$
$$\hspace{2.5cm} | \hspace{3cm}$$
$$\hspace{2.5cm} CF_3 \hspace{3cm}$$

wherein Z is hydrogen or fluorine, x is an integer of 0-4 and y is an integer of 0-7. Preferred embodiments are perfluoro(methyl vinyl ether) represented by the formula (2)

$$CF_2=CF-O-CF_3 \quad (2)$$

or perfluoro(ethyl vinyl ether) represented by the formula (3)

$$CF_2=CF-O-C_2F_5 \quad (3)$$

or perfluoro(propyl vinyl ether) represented by the formula (4)

$$CF_2=CF-O-C_3F_7. \quad (4)$$

Particularly preferable are those represented by the following formulas (5) to (10)

$$CF_2=CF-O-CF_2CF-O-CF_2CF_3, \quad (5)$$
$$\hspace{3cm} | \hspace{3cm}$$
$$\hspace{3cm} CF_3 \hspace{3cm}$$

$$CF_2=CF-(O-CF_2CF)_2-O-CF_2CF_3, \quad (6)$$
$$\hspace{3.5cm} | \hspace{3cm}$$
$$\hspace{3.5cm} CF_3 \hspace{3cm}$$

$$CF_2=CF-O-CF_2CF-O-(CF_2)_2CF_3, \quad (7)$$
$$\hspace{3cm} | \hspace{3cm}$$
$$\hspace{3cm} CF_3 \hspace{3cm}$$

$$CF_2=CF-(O-CF_2CF)_2-O-(CF_2)_2CF_3, \quad (8)$$
$$\hspace{3.5cm} | \hspace{3cm}$$
$$\hspace{3.5cm} CF_3 \hspace{3cm}$$

$$CF_2=CF-O-CF_2CF-O-(CF_2)_3CF_3, \quad (9)$$
$$\hspace{3cm} | \hspace{3cm}$$
$$\hspace{3cm} CF_3 \hspace{3cm}$$

$$CF_2=CF-(O-CF_2CF)_2-O-(CF_2)_3CF_3. \quad (10)$$
$$\hspace{3.5cm} | \hspace{3cm}$$
$$\hspace{3.5cm} CF_3 \hspace{3cm}$$

According to the invention, as described above, it is possible to improve the molding properties of the polymeric material and largely improve the antistatic effect and mechanical properties of the moldings while maintaining the characteristics of the polymeric material.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
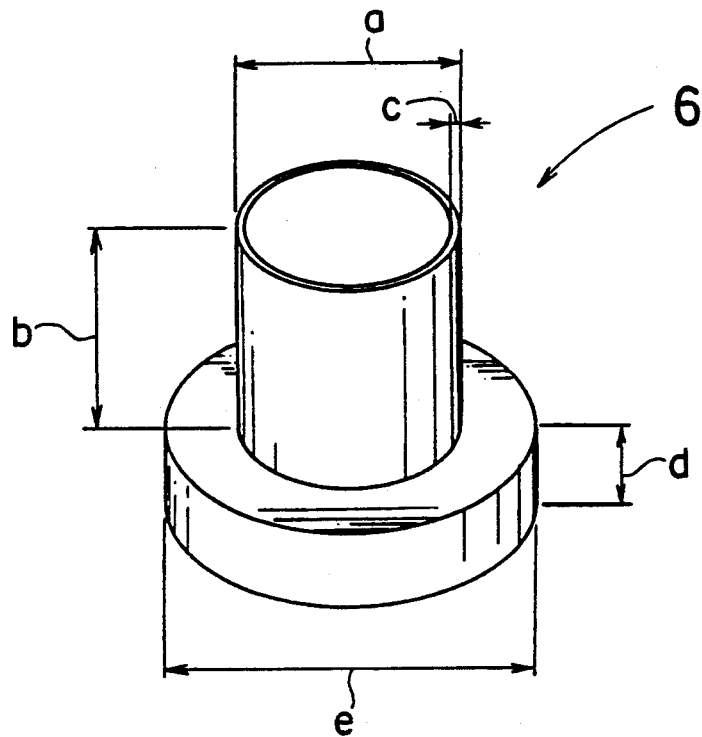
FIG. 1 is a perspective view showing the configuration of a molding 6 made of an embodiment of the non-electrification polymeric composite material according to the invention.

Now referring to the drawing, preferred embodiments of the invention are described below. Preparation of Perfluoro(alkyl vinyl ether)/tetrafluoroethylene Copolymer (PFA)

Two hundred parts by weight of deoxidized, demineralized water was charged in a glass autoclave with stirrer capable of accommodating 1000 parts by weight of water, and after thoroughly replacing the internal space with pure nitrogen gas and exhausting it, 150 parts by weight of 1,2-dichloro-1,1,2,2-tetrafluoroethylene, X parts by weight of perfluoro(propyl vinyl ether), and, for adjusting the molecular weight, Y parts by weight of methanol were forced in. The X parts by weight of perfluoro(propyl vinyl ether) and Y parts by weight of methanol in Examples 1–5 and Reference Examples 1 and 2 are shown in Table 1.

With the inside of each system successively held at 15° C., tetrafluoroethylene was forced into the autoclave and the pressure in the autoclave was held at 2.9 kg/cm²G. Thereto, was added 0.8 parts by weight of $(ClCF_2CF_2COO)_2$ as the polymerization initiator (referred to as the polymerization initiator A) to start a reaction. Since the pressure decreases as the reaction proceeds, tetrafluoroethylene was additionally forced in to keep the pressure in the autoclave from 2.4 to 2.9 kg/cm²G. When the reaction rate was retarded, the polymerization initiator A was adequately added. When forced-in tetrafluoroethylene reached a given quantity, the reaction was stopped and polymerized powder was obtained.

The perfluoro(alkyl vinyl ether/tetrafluoroethylene copolymer (referred to as PFA) containing the thus prepared perfluoro(propyl vinyl ether) was mixed with acetylene black, an electrically conductive material, in a Henshell mixer, and pelletized by melt extrusion method. The pelletized mixture was, for example, molded into cylindrical moldings shown in FIG. 1 by use of an injection molding machine at a cylinder temperature 270°~360° C., a mold temperature 180° C., under injection pressure 360 kgf/cm², retention pressure 450 kgf/cm², and in cycle time 100 sec. Table 2 shows the results of Examples 1 to 5 and Reference Examples 1 and 2 in comparison.

TABLE 2

|  | Example 1 | Example 2 | Example 3 | Example 4 | Example 5 | Reference Example 1 | Reference Example 2 |
|---|---|---|---|---|---|---|---|
| Perfluoro (propyl vinyl ether) Content (wt %) | 5.0 | 4.1 | 8.9 | 8.5 | 4.9 | 3.4 | 3.5 |
| Melt index of copolymer (g/10 min) | 25.0 | 30.9 | 33.6 | 50.9 | 32.5 | 26.4 | 16.2 |
| Acetylene black content (wt %) | 8 | 6.5 | 8 | 8 | 10 | 8 | 8 |
| Melt index of electrifiable polymeric material (g/10 min) | 12.0 | 14.7 | 15.8 | 20.1 | 9.8 | 10.9 | 6.5 |
| Tensile strength (kgf/cm²) | 182 | 167 | 277 | 276 | 191 | 161 | 205 |
| Tensile elongation (%) | 265 | 238 | 312 | 352 | 255 | 103 | 299 |
| Crack occurrence | 0/10 | 0/10 | 0/10 | 0/10 | 0/10 | 2/10 | 0/10 |
| Volume specific resistance $\rho v$ ($\Omega \cdot cm$) | $1.9 \times 10^8$ | $2.1 \times 10^{11}$ | $1.3 \times 10^8$ | $5.1 \times 10^8$ | $2.8 \times 10^3$ | $1.7 \times 10^9$ | $3.8 \times 10^9$ |

TABLE 1

|  | Example 1 | Example 2 | Example 3 | Example 4 | Example 5 | Reference Example 1 | Reference Example 2 |
|---|---|---|---|---|---|---|---|
| Perfluoro (propyl vinyl ether) X | 15 | 12 | 28 | 28 | 15 | 10 | 10 |
| Methanol Y | 37 | 47 | 20 | 28 | 40 | 54 | 36 |

Figure 4:
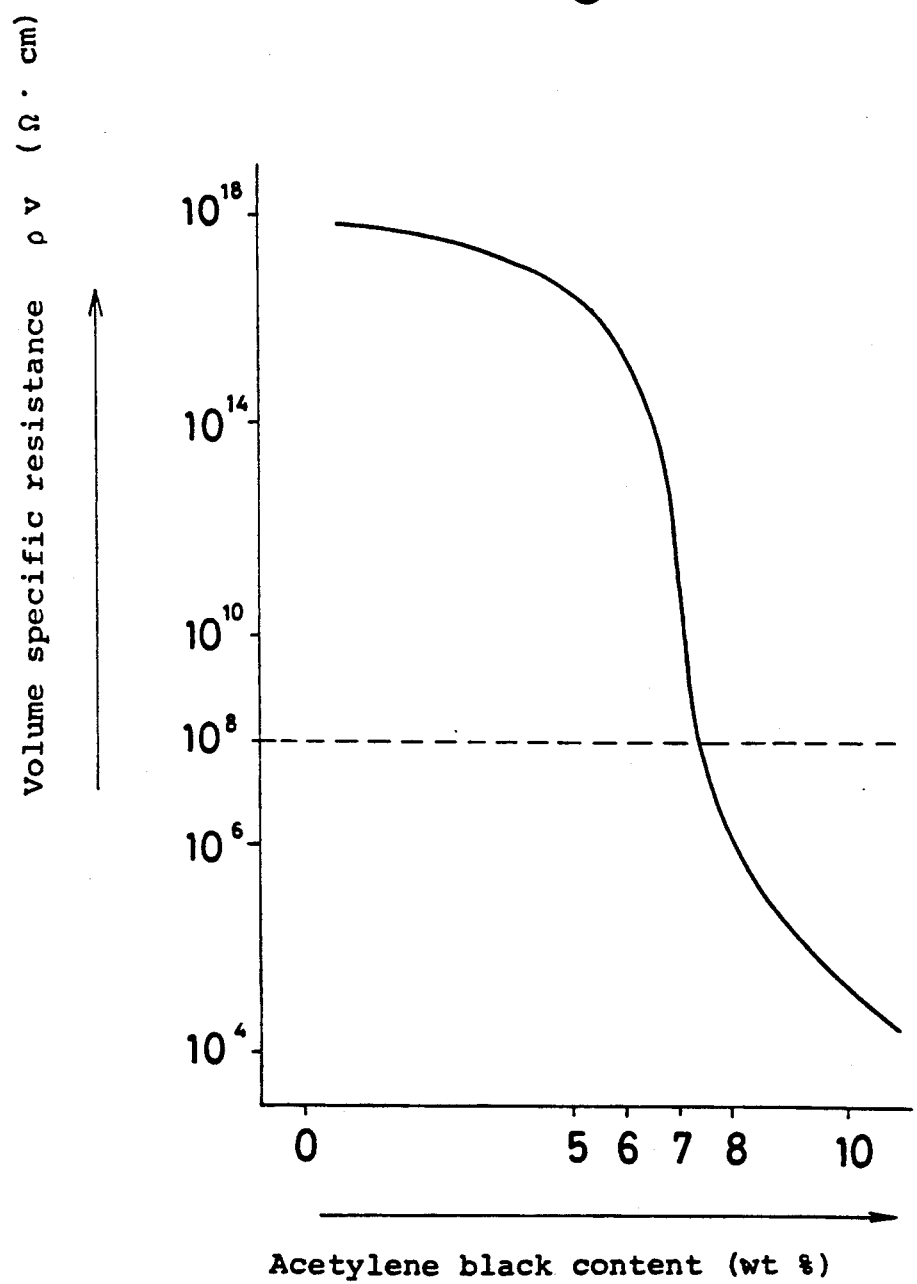
FIG. 4 is a graph showing the relationship between the acetylene black content and the volume specific resistance ρv of the non-electrification polymeric composite material according to the invention.

Unlike compression and extrusion moldings, injection molding forms the moldings into layer structure. This increases the volume specific resistance $\rho v$ of the molding. When about 6% by weight of acetylene black is added as an electrically conductive material, in a compression molding the volume specific resistance $\rho v$ is about $10^9$ $\Omega$.cm, while in an injection molding the volume specific resistance $\rho v$ is as large as $10^{13}$ $\Omega$.cm as shown in FIG. 4.

This deteriorates the non-electrification characteristic of the non-electrification polymeric composite material. The volume specific resistance $\rho v$ is rapidly decreased around 7% by weight acetylene black content as shown in FIG. 4. Therefore, to give an adequate volume specific resistance $\rho v$ in injection molding, the electrically conductive material must be contained about 7% by weight or more.

Figure 5:
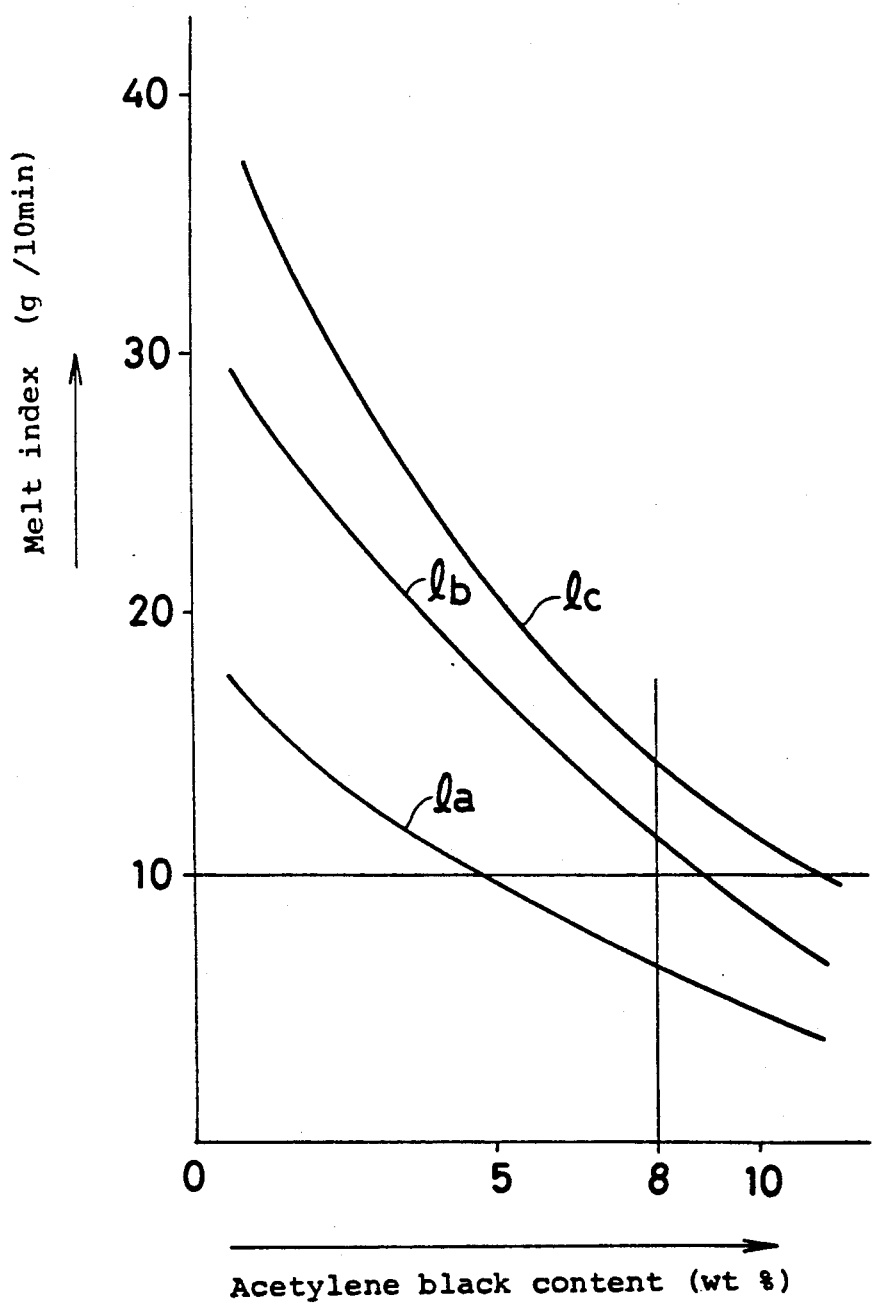
FIG. 5 is a graph showing the relationship between the melt index and the content of the acetylene black of the non-electrification polymeric composite material according to the invention.

When the fluoro(alkyl vinyl ether)/tetrafluoroethylene copolymer according to the invention is used, to obtain a melt index of 10 g/10 min or more which makes injection molding possible, the acetylene black content must be about 8% by weight or less as shown by lines lb and lc in FIG. 5. The line la represents the case of conventional PFA. Therefore, to obtain a non-electrification polymeric composite material having a volume specific resistance and melt index adapted to injection molding, it is preferable to add about 8% by weight acetylene black. Acetylene black content about 8% by weight gives good results also in the chalking test where the sample is rubbed against the surface of filter paper and the transcription is measure.

The measurements shown in Table 2 were measured according to the following method:

(1) Perfluoro(propyl vinyl ether) Content

The tetrafluoroethylene/perfluoro(propyl vinyl ether) copolymer containing perfluoro(propyl vinyl ether) was melted and measured by the $F^{19}$ nuclear magnetic resonance method ($^{19}$F-NMR). The measurements in Examples 1–5 and Reference Examples 1 and 2 are shown in Table 1.

(2) Melt Index

The extrusion rate (g/10 min) from an orifice of diameter 2.0955±0.0051 mm, and length 8.000±0.025 mm was measured at a temperature of 372°±1° C. under a load of 5000 g as the melt index, as described in ASTM D-3307.

(3) Crack Occurrence

By use of an injection molding machine, ten moldings 6 as shown in FIG. 1 were prepared and the number of pieces which produced cracks were counted. The molding 6 was composed of a cylinder section of outside diameter a, height b, thickness c and a pedestal section of outside diameter a, height d.

The outside diameter a and height b of the molding 6 are, for example, 44 mm, and the outside diameter c is, for example, 77 mm, and the height d is 12 mm.

(4) Tensile Strength and Tensile Elongation

Figure 2:
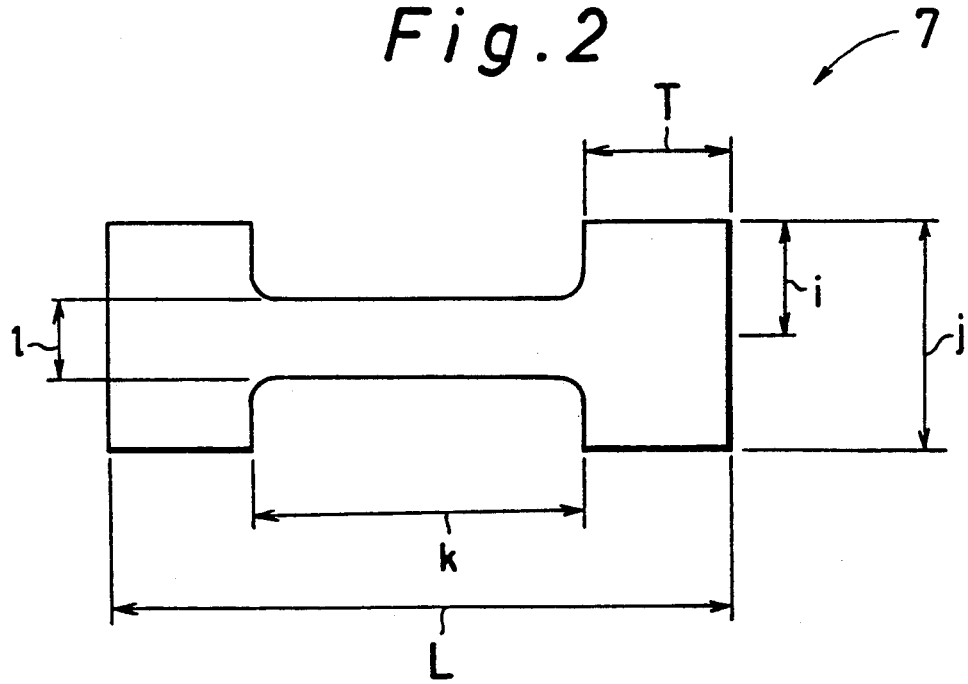
FIG. 2 is an elevational view showing the configuration of a dumbell 7 made of a material according to the invention.

A dumbbell 7 shown in FIG. 2 was punched by the method described in ASTM D-3307 and was subjected to tensile tests at a stretching rate of 51 mm/min.

In FIG. 2, the dimensions of dumbell 7 are: i is 0.312 inches, j is 0.625 inches, l is 0.187 inches and k is 0.876 inches. The allowable error of dumbbell 7 is ±0.002 inches and the thickness of the dumbbell 7 is the thickness of the sheet when the dumbbell is punched. The width T is 0.312 inches at a minimum or may be larger. The minimum length L is 1.50 inches.

(5) Volume Resistivity ρv.

Figure 3:
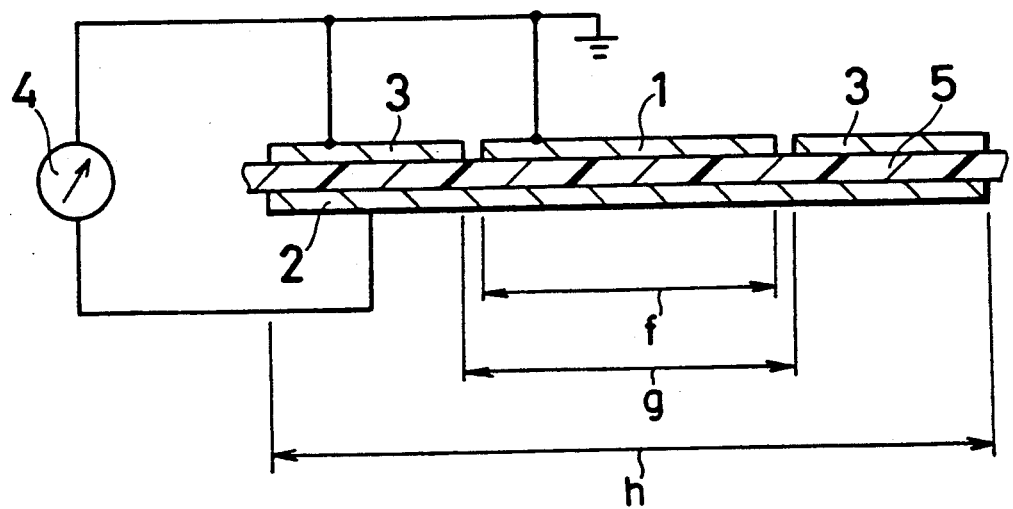
FIG. 3 is an illustration of the method of measuring the volume specific resistance ρv of an embodiment of the non-electrification polymeric composite material according to the invention.

As shown in FIG. 3, a flat board 5, for example, 2 mm thick is manufactured by injection molding. On the top surface of this flat board 5 (FIG. 3) is put in contact a disk-like main electrode 1 having a diameter f, and on the bottom surface of the flat board 5 (FIG. 3) is put in contact a disk-like opposite electrode 2 having a diameter h. In this state, the resistance between the main electrode 1 and the opposite electrode 2 is measured by use of a ultra high megohm meter 4. To shield a current conducted along the surface of the flat board 5, a guard electrode 3 of outside diameter h having a hole of inside diameter g is provided on top of the flat board (FIG. 3). The diameter f is, for example, 20 mm, diameter and outside diameter h is, for example, 48 mm, and inside diameter g is, for example, 22 mm.

In Reference Example 1 as shown in Table 2, the tensile elongation was low as 103% and two pieces of the moldings among 10 showed cracks produced. Thus, Control 1 is found to be inadequate as the material of a holder for holding the wafer for semiconductor device. In Reference Example 2, the melt index after the addition of acetylene black is as small as 6.5 g/10 min, and Reference Example 2 is inadequate as a material for injection molding.

In Examples 1–5, the tensile strength and tensile elongation showed good values and no crack was produced in moldings. The volume specific resistance ρv was satisfactory for giving the non-electrification characteristic.

Thus, according to the examples, it is possible to attain excellent injection molding properties while maintaining the resistance to chemicals and heat resistance of PFA, by mixing acetylene black into tetrafluoroethylene/perfluoro(propyl vinyl ether) copolymer containing 4% by weight or more perfluoro(propyl vinyl ether), to obtain a non-electrification polymeric composite material suitable to compose a wafer holding holder.

The non-electrification polymeric composite material according to the invention is not limited to the use as the wafer holding holder as the above, but also can be applied as moldings to a wide technical field such as an etching layer of a semiconductor device, piping, valve, and transport vessels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A non-electrification polymeric composite material, comprising a tetrafluoroethylene/fluoro(alkyl vinyl ether) copolymer containing 4 to 15% by weight of said fluoro(alkyl vinyl ether) and 1 to 15% by weight of a single electrically conductive material selected from the group consisting of carbon blacks, carbonaceous fiber, graphite, a metal and a metal oxide, said fluoro(alkyl vinyl ether) being represented by the formula

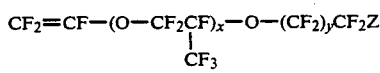

wherein x is an integer from 0–4, y is an integer from 0–7, and Z is hydrogen or fluorine, and said tetrafluoroethylene/fluoro(alkyl vinyl ether) copolymer having a melt index of 20 g/10 min. to 50 g/10 min.

2. A non-electrification polymeric composite material according to claim 1, wherein said tetrafluoroethylene/fluoro(alkyl vinyl ether) copolymer contains 4 to 10% by weight of said fluoro(alkyl vinyl ether).

3. A non-electrification polymeric composite material according to claims 1, or 2, wherein said electrically conductive material is acetylene black.

4. A non-electrification polymeric composite material according to claim 1, which contains 1 to 10% by weight of the electrically conductive material.

5. A non-electrification polymeric composite material according to claim 1, wherein x is an integer from 0 to 2.

6. A non-electrification polymeric composite material according to claim 1, wherein y is an integer from 0 to 3.

7. A non-electrification polymeric composite material according to claim 1, wherein Z is fluorine.

8. A non-electrification polymeric composite material according to claim 1 or 3, wherein said electrically conductive material is a white electrically conductive material of fibrous potassium titanate or titanium oxide covered with tin oxide and antimony oxide.

* * * * *